United States Patent [19]
Frederick

[11] 3,724,204
[45] Apr. 3, 1973

[54] FLEXIBLE CHAIN FOR PERSONAL WEAR

[76] Inventor: William N. Frederick, 1858 North Sedgwick, Chicago, Ill. 60614

[22] Filed: Oct. 15, 1971

[21] Appl. No.: 189,693

[52] U.S. Cl............................................59/80, 63/4
[51] Int. Cl............................................F16g 13/00
[58] Field of Search............59/78, 80, 82, 90, 91, 84, 59/85; 63/4

[56] References Cited

UNITED STATES PATENTS

| | | | |
|---|---|---|---|
| 1,720,235 | 7/1929 | Prestinari | 59/80 |
| 1,882,666 | 10/1932 | Kestenman | 63/4 |
| 2,217,052 | 10/1940 | Hall | 59/85 |

FOREIGN PATENTS OR APPLICATIONS

| | | | |
|---|---|---|---|
| 821,182 | 9/1959 | Great Britain | 59/78.1 |
| 128,944 | 8/1950 | Sweden | 59/84 |

*Primary Examiner*—Charles W. Lanham
*Assistant Examiner*—Gene P. Crosby
*Attorney*—Stone, Zummer & Aubel

[57] ABSTRACT

A chain useful as a bracelet and necklace comprised of a plurality of independent link members and coupling bars linked to provide a flexible chain of attractive appearance and having no clasp. A coupling bar can be inserted past a constriction in the link member only when the plane of the coupling bar is substantially normal to the plane of the link member.

5 Claims, 12 Drawing Figures

PATENTED APR 3 1973 3,724,204
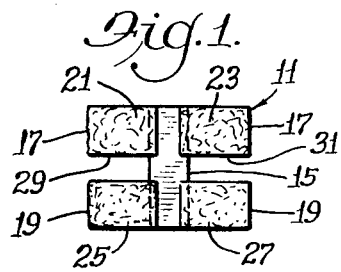
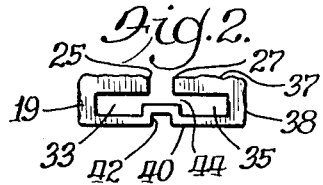
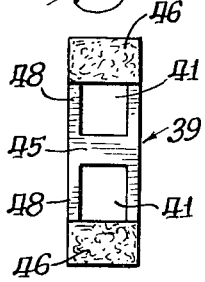
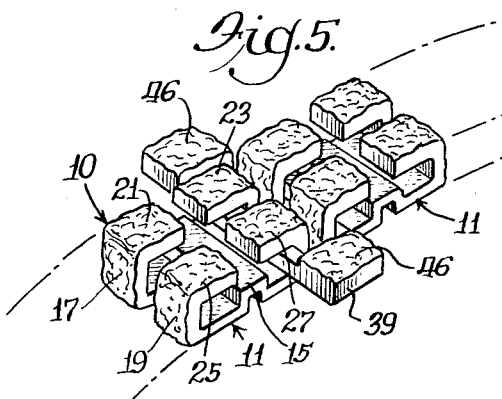
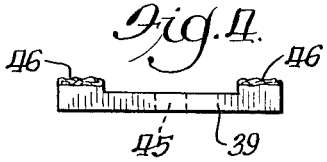
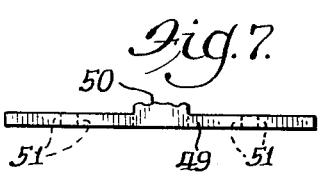
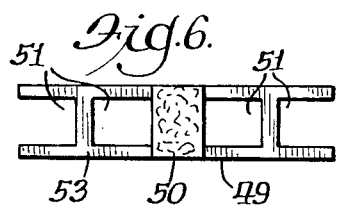
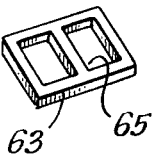
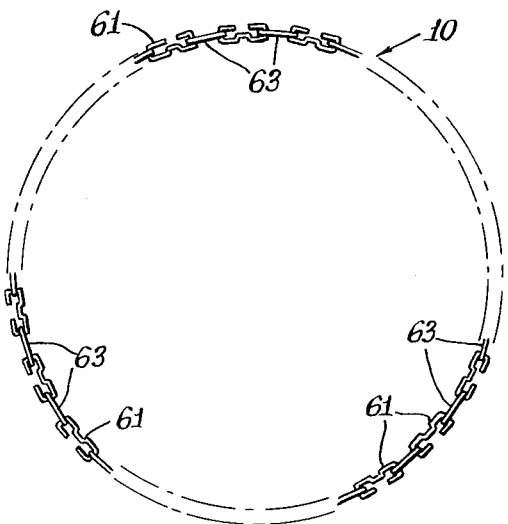
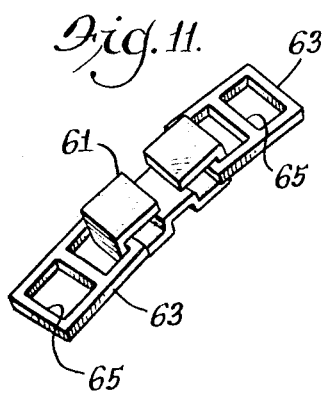
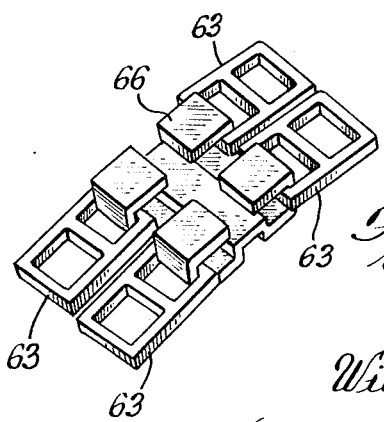
Inventor:
William N. Frederick
By Stone, Zummer & Aubel
Attys.

FLEXIBLE CHAIN FOR PERSONAL WEAR

This invention relates to chain such as for use as a bracelet or necklace formed of a plurality of links and coupling bars to provide a flexible unit which has no clasp and which has an entirely symmetrical appearance; and, further, which can be opened or unhooked at any position for purposes of putting on or taking off the bracelet or necklace on the wrist or around the neck of user.

Various prior art link type bracelets and necklaces are known which are flexible and which have links and coupling bars which may be worn by the user. Flexible bracelets are also known which are formed into a ring and then are expandable to be placed over the hand of the user and then restrict to fit tightly on the wrist of the user. Other prior art bracelets are known where the links are bent to a particular configuration to permit the bracelet to flex and which are closed by means of a clasp.

While such prior art link type bracelets and necklaces are useful and attractive, it is a principal object of the present invention to provide an improved link type chain which may be used both as a bracelet or as a necklace.

In the bracelet of the invention the chain is flexible in that separate distinct links and coupling bars can be joined to form the chain so that the chain will conform to the wrist or neck of the user, but it is not flexible in that once formed of a certain determine it will not expand or constrict to different diameters.

Accordingly, it is another object of the present invention to provide an improved bracelet or necklace wherein the links and the coupling bars are formed as separate elements which are movable or separately attachable to each other to conform to a desired diameter and wherein the chain does not require a clasp for closure and is, therefore, symmetrical and uniform in appearance throughout.

It is another object of the present invention to provide a chain bracelet or necklace which can be hooked or unhooked at any position to the user's wrist or neck. Further, the chain can be unhooked at any position to add or remove one or more links or coupling bars to the bracelet to adjust the diameter of the bracelet to conform to the user's wrist or neck.

It is a further object of the invention to provide a bracelet or necklace which is uniform in appearance entirely around its periphery with no clasp showing.

The foregoing objects and advantages of the invention will become apparent from the following more specific description of the invention taken in conjunction with the following drawings wherein:

FIG. 1 is a plan view of a link member for the chain of the invention;

FIG. 2 is a side view of the link of FIG. 1;

FIG. 3 is a plan view of a coupling bar for the chain of the invention;

FIG. 4 is a side view of the bar of FIG. 3;

FIG. 5 is an isometric view of the coupling bar joining the link members as part of a chain;

FIG. 6 is a plan view of another embodiment of the coupling bar;

FIG. 7 is a side view of the bar of FIG. 6.

FIG. 8 is an isometric view of another embodiment of the link member;

FIG. 9 is an isometric view of another embodiment of the coupling bar;

FIG. 10 is a side view of the inventive chain; and

FIG. 11 is an isometric view of the link member of FIG. 8 joining coupling bar of FIG. 9.

FIGS. 1 and 2 show an embodiment of a link member 11 used in forming the chain 10 (see briefly FIGS. 5 and 10) in accordance with the invention wherein the link member comprises a rectangular piece in outline formed in I-shape as shown in the top view of FIG. 1 and with a central vertical (as oriented in FIG. 1) leg 15, upper horizontal arm 17 and a lower horizontal arm 19. The ends 21 and 23 of upper arm 17 and the ends 25 and 27 of lower arm 19 are bent toward the center of each respective arm in substantially hook fashion to form a bright portion of recesses 29 and 31 between the bent arm 17 and recesses 33 and 35 between the bent arm 19. The upper surface 37 of link member 11 and its sides 38 have a textured or raised random pattern while the bottom surface 40 of the link 11 is smooth.

As best seen in the view of FIG. 2 the center vertical leg 15 is raised relative to the upper surface of the mid portion of the arms 17 and 19 and the lower surface of the leg 15 forms a groove 42 extending along its length. The end 21 or arm 17 and the end 25 or arm 19 in conjunction with the raised surface of leg 15 forms a restricted opening 43 through which a coupling bar 39 of FIGS. 3 and 4 may be inserted onto recesses 29 and 33 as will be explained. Likewise the end 23 of arm 17 and the end 27 of arm 19 in conjunction with the raised of leg 15 forms a restricted opening 44 through which a coupling bar 39 may be inserted into recessed 34 and 35.

The coupling member of bar 39 of FIGS. 3 and 4 comprises an essentially rectangular member having a pair of rectangular apertures 41 in its center. The surfaces 46 at either end of the coupling bar have a textured or raised pattern similar to that of link 11. The central portion 45 of the coupling bar 39 is reduced in height (see FIG. 4) and the edges 48 of the bar adjacent the apertures 41 are of a reduced thickness to enable insertion of the edges 45 through the openings 43 or 44, coupling bar 39 is returned essentially in the plane of link 11. Any desired number of links 11 and coupling bars 39 can thus be joined to as shown in FIG. 5 to thereby form a circular chain 10 ring (see FIG. 10) of the diameter desired.

In a second embodiment of the invention as shown in FIG. 6, the coupling bar 49 comprises as essentially double H member having the contiguous ends of the H joined by a patterned surface portion 50. The double H member also includes apertures 51 and reduces edges 53 to similar to apertures 41 and edges 49 of bar 39 of FIGS. 3 and 4. Edges 48 are inserted through openings 43 or 44 into the recesses of 29 and 33 or 31 and 35 of the link 11 in a position which is normal to the plane of the link and then urged to a position in the plane of link 11. The bar 49 enables a bracelet or necklace chain to be formed with two links 11 placed side by side to thereby double the width of the chain formed with the coupling bars 39 of FIGS. 3 and 4.

Other embodiments of the inventive link 61 and of a coupling bar 63 are shown in FIGS. 8, 9, and 12. The link 61 is essentially half the width of link 11 and coupling bar 63 is essentially half the width of coupling bar; compare, for example, FIGS. 5 and 12.

The coupling bar 63 shown in FIG. 9 includes a rectangular member having a pair of center apertures 65. The sides of bar 63 are also reduced in width to enable inseration into the recesses of links 11 or 61. If desired, a pair of the coupling bars 63 can be used to affix the links 11 or 61 one to each other similarly to that shown in FIG. 12.

Note that while the width of the units of FIGS. 8, 9, and 11 are half the height of the units shown in FIGS. 1-7, the length of the units measured along the periphery of a chain formed by the units is the same. Hence the various units are interchangeable to form bracelets of various designs. For example, a chain of narrow strand can be formed as shown in FIG. 11; or a chain which is of narrow strand can interconnect with a chain which is of broader strand such as indicated in FIG. 12.

As mentioned, each of the various links 11, 61 and 66 may be coupled to one another by means of the coupling bars 39, 48 and 63 to provide a chain for a bracelet or necklace. To unhook the chain at any point, one of the coupling bars may be relatively rotated to a position approximately normal to the plane of the link to which it is attached, and then slid through the restricted opening (43 or 44 in FIG. 2) formed between the vertical 15 and the bent over end of the arms 21 and 25 or 23 and 27. Also, in this manner the one or more links and coupling bars can be added or removed from the chain to vary the diameter of the chain.

While the invention has been particularly shown and described with reference to preferred embodiments thereof, it will be understood by those skilled in the art that various changes in form and details may be made therein without departing from the spirit and scope of the invention.

I claim:

1. For use in a chain forming a bracklet and necklace link members and coupling bars, said link members comprising and having a vertical leg and horizontal arms defining hook and bright portions, the vertical leg forming a raised section adjacent said hook portion to provide a constricted entry into said bright portion, and said coupling bars formed to have a portion which can pass through said constriction only when the plane of said coupling member is substantially normal to the plane of said link member to thereby enable said coupling bar to hook onto said link member and remain captured therein.

2. Apparatus as in claim 1 wherein said link members comprise an essentially I-shape having textured upper and side surfaces.

3. Apparatus as in claim 1 wherein said coupling bars are in the form of two serially connected H-shapes.

4. Apparatus as in claim 1 wherein said coupling bars and link members are of modular construction to be interchangeable.

5. Apparatus as in claim 1 wherein said link member comprises essentially four hook portions, and four coupling bars coupled thereto.

* * * * *